UNITED STATES PATENT OFFICE.

WILHELM WEBER, OF STOLBERG II, GERMANY, ASSIGNOR TO CHEMISCHE FABRIK-RHENANIA, OF AACHEN, GERMANY.

COMPOUND OF PANCREAS ENZYMES WITH HEAVY METALS AND PROCESS OF OBTAINING SAME.

SPECIFICATION forming part of Letters Patent No. 689,149, dated December 17, 1901.

Application filed May 27, 1901. Serial No. 62,137. (No specimens.)

*To all whom it may concern:*

Be it known that I, WILHELM WEBER, a citizen of Germany, residing at Stolberg II, Rheinland, in the Empire of Germany, have invented certain new and useful Compounds of Pancreas Enzymes with Heavy Metals and Process of Obtaining the Same, (for which I have made application for a patent in Germany, dated November 1, 1900, and by patent of addition, dated November 12, 1900,) of which the following is a specification.

The great importance attached to the organic metallic compounds, especially the metal proteid compounds, in surgery and the therapeutics of infectious diseases indicates the desirability of combining the enzymes of the pancreas gland with heavy metals, so as to obtain a product which has at the same time the specific effect of the enzymes and of the heavy metal.

I have discovered that under certain conditions, such as when rise of temperature and large excess of the precipitant are avoided, the enzymes in question are not at all so sensitive to the salts of the heavy metals as has been generally accepted, (compare *Allen's Commercial Organic Analysis*, Vol. 4, page 354,) and that the products, even those containing much metal, have a powerful digestive action on proteids.

My invention relates to the manufacture of such compounds of heavy metals and pancreatic enzymes by precipitating an aqueous extract of a dry preparation of the pancreas or the fresh pancreas-juice with the salt of a heavy metal. The heavy-metal salt is preferably that of an organic acid, and it may either be added directly to the enzyme solution or be formed in the solution from an easily-soluble inorganic salt of a heavy metal and an alkali salt of an organic acid. The products are light-yellow to light-brown powders, insoluble in water, but soluble in alkali solutions and partially also in sodium-chlorid solution without reduction or precipitation of the metal. The silver compound is sensitive to light, both in the solid state and in solution, but it may be preserved indefinitely if protected from light. The compounds containing silver, mercury, bismuth, iron, and zinc, respectively, are the most important.

The invention is illustrated by the following examples:

I. One hundred grams of pancreatin are extracted with water and there is added to the extract while this is being stirred a solution of forty grams of silver acetate or an equivalent quantity of some other silver salt. The precipitate is washed by decantation and pressed. It is either dried directly or is first made into a soluble mixture by addition of sodium chlorid, sodium carbonate, or like salt. Instead of an extract of pancreatin fresh pancreas-juice may be used. The compound contains about twenty-five per cent. of silver.

II. One hundred grams of pancreatin are extracted with water and thirty grams of sodium acetate or the equivalent quantity of another organic salt of an alkali are dissolved in the extract. A solution of ferric chlorid or of another inorganic salt of iron is now added until precipitation is complete. The precipitate is washed and dried by gentle heating. The compound contains about five per cent. of iron.

III. In the aqueous extract of pancreatin prepared as described in Example I or in fresh pancreas-juice is dissolved enough sodium chlorid to produce a turbidity. There is now added a solution containing twenty per cent. of a bismuth salt (such as bismuth trichlorid) and saturated with sodium chlorid until precipitation is complete. The precipitate is collected and washed first with a saturated solution of sodium chlorid and finally with water. It is then dried by gentle heating. The compound contains about thirty-eight per cent. of bismuth.

As the percentage of metal in the compounds obtained as above described is somewhat too high for therapeutic application it is advisable to reduce this percentage by using a smaller proportion of precipitant or by dilution with a suitable indifferent material. Thus the silver compound may be limited to some fifteen per cent. of silver, the mercury compound to about ten per cent. of mercury, and the bismuth compound to about ten per cent. of bismuth.

Having thus described the nature of my said invention and the best means I know of carrying the same into practical effect, I claim—

1. A process for obtaining compounds of pancreas-enzymes consisting in first extracting pancreatin with water, adding the salt of a heavy metal to the extract while stirring, then suitably washing the precipitate.

2. A composition of matter consisting of the enzymes of pancreas chemically combined with a heavy metal, forming light-yellow to brown powders as described.

In testimony whereof I have hereunto set my hand in presence of two subscribing witnesses.

WILHELM WEBER.

Witnesses:
C. E. BRUNDAGE,
FRITZ STOLLEWERK.